United States Patent [19]
Staudhammer et al.

[11] Patent Number: 5,786,543
[45] Date of Patent: Jul. 28, 1998

[54] APPARATUS FOR INFLATING A VEHICLE OCCUPANT RESTRAINT

[75] Inventors: Peter Staudhammer, Mayfield Heights, Ohio; Jack L. Blumenthal, Los Angeles, Calif.

[73] Assignee: TRW Vehicle Safety Systems, Inc., Lyndhurst, Ohio

[21] Appl. No.: 760,425

[22] Filed: Dec. 4, 1996

[51] Int. Cl.$^6$ ............................ C06D 5/06; B60R 21/28
[52] U.S. Cl. ........................ 102/288; 102/289; 280/741
[58] Field of Search ........................ 102/288, 289; 280/741, 737

[56] References Cited

U.S. PATENT DOCUMENTS

| | | | |
|---|---|---|---|
| 3,806,153 | 4/1974 | Johnson | 280/150 AB |
| 3,868,124 | 2/1975 | Johnson | 280/150 AB |
| 3,895,821 | 7/1975 | Schotthoefer et al. | 280/150 AB |
| 5,348,344 | 9/1994 | Blumenthal et al. | 280/737 |
| 5,394,908 | 3/1995 | Maness | 141/1 |
| 5,427,160 | 6/1995 | Carson et al. | 141/4 |
| 5,531,473 | 7/1996 | Rink et al. | 280/737 |
| 5,607,181 | 3/1997 | Richardson et al. | 280/737 |
| 5,673,934 | 10/1997 | Saccone et al. | 280/737 |

*Primary Examiner*—Peter A. Nelson
*Attorney, Agent, or Firm*—Tarolli, Sundheim, Covell, Tummino & Szabo

[57] ABSTRACT

A vehicle safety apparatus (10) for inflating a vehicle occupant restraint (12) includes a container (14) for receiving gases. The gases in the container (14) are a combustible gas, an oxidizer gas, an inert gas and a combustion rate modifier gas selected from the group consisting of an inert carbonaceous gas, water vapor, and mixtures thereof. An igniter is activated to effect ignition of the combustible gas in response to sudden vehicle deceleration indicative of a collision condition. The ignition of the combustible gas in the presence of oxygen results in combustion products including heat. The heat from the combustion products heats at least the inert gas. A directing means directs a flow of gases from the container into the inflatable occupant restraint. The combustion rate modifier gas is present in the container (14) in an amount sufficient to reduce the rate of combustion of the combustible gas.

21 Claims, 1 Drawing Sheet

APPARATUS FOR INFLATING A VEHICLE OCCUPANT RESTRAINT

FIELD OF THE INVENTION

The present invention relates to a new and improved apparatus for inflating an inflatable vehicle occupant restraint such as an air bag, and particularly relates to an ignitable gaseous mixture in an air bag inflator.

BACKGROUND OF THE INVENTION

Known apparatus for inflating an air bag includes a stored primary inflation fluid and an ignitable material. Upon the occurrence of vehicle deceleration which is indicative of a vehicle collision and for which air bag inflation is desired, the ignitable material is ignited. As the ignitable material burns, it heats the primary inflation fluid. The primary inflation fluid and products of combustion of the ignitable material are directed into an inflatable vehicle occupant restraint to inflate the vehicle occupant restraint. The inflated vehicle occupant restraint helps protect a vehicle occupant during the collision.

SUMMARY OF THE INVENTION

The present invention provides a new and improved apparatus for inflating an inflatable vehicle occupant restraint. The apparatus includes a container for holding a supply of gas. The supply of gas comprises a mixture of an inert gas, a combustible gas, an oxidizer gas, and a combustion rate modifier gas which is selected from the group consisting of an inert carbonaceous gas, water vapor, and mixtures thereof. The apparatus also includes an igniter means for igniting the combustible gas in the presence of the oxidizer gas to generate combustion products, including heat, to heat the inert gas. The apparatus further includes a directing means which directs gas from the container to the vehicle occupant restraint to inflate the vehicle occupant restraint.

The inert gas is preferably nitrogen. The combustible gas is hydrogen, methane or a mixture of hydrogen and methane but may be any other flammable gas. The oxidizer gas is preferably oxygen. The combustion rate modifier gas controls the rate of combustion of the combustible gas and is preferably carbon dioxide, a halogenated hydrocarbon gas, water vapor, or a mixture thereof. A small amount of a tracer gas such as helium may also be added to assist in leak detecting, as is known.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF EMBODIMENTS OF THE INVENTION

Figure 1:
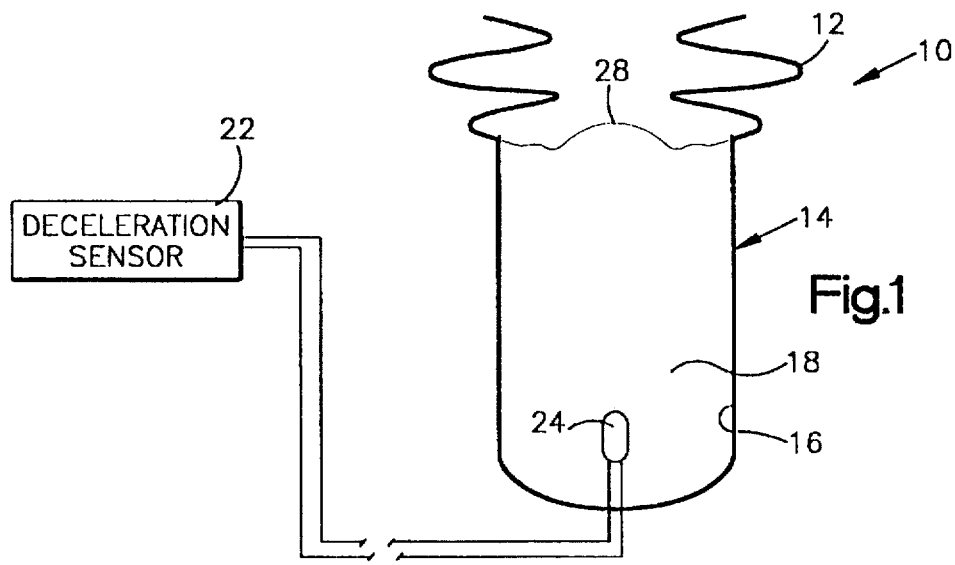
FIG. 1 is a schematic illustration of one embodiment of the present invention.

The present invention may be embodied in a number of different structures. As representative, FIG. 1 illustrates the present invention as embodied in a vehicle occupant safety apparatus 10. The vehicle occupant safety apparatus 10 includes an inflatable vehicle occupant restraint 12 in the form of an air bag. The apparatus 10 also includes a container 14 (an inflator) which contains gas for inflating the vehicle occupant restraint 12.

Upon the occurrence of a high rate of vehicle deceleration which is indicative of a vehicle collision, the vehicle occupant restraint 12 is inflated to protect an occupant of the vehicle. The inflatable vehicle occupant restraint 12 is inflated into a location in the vehicle between the occupant and certain parts of the vehicle, such as the steering wheel, instrument panel, side of the vehicle or the like. The inflated vehicle occupant restraint 12 protects the occupant from forcibly striking parts of the vehicle.

The vehicle occupant restraint 12 is inflated by a flow of inflation fluid from the container 14. The container 14 has a chamber 16 which holds a mixture 18 of gases. The mixture 18 of gases includes an inert gas, a combustible gas, an oxidizer gas for supporting combustion of the combustible gas, and combustion rate modifier gas selected from the group consisting of an inert carbonaceous gas, water vapor, and mixtures thereof.

The inert gas is preferably nitrogen. The combustible gas is preferably hydrogen or methane, but may be another hydrocarbon gas such as ethane or propane or an alcohol or an ether. The combustible gas could also be a mixture of hydrogen and a hydrocarbon gas. The oxidizer gas is preferably oxygen. Examples of inert carbonaceous gases for combustion modification are carbon dioxide, and halogenated hydrocarbon gas such as 1,1,1,1-tetrafluoromethane, 1,1,2,2-tetrafluoroethane and mixtures thereof. The halogenated hydrocarbon gases are available under the trademark Freon from E. I. DuPont de Nemours & Co.

The mixture 18 of gases could have many different compositions. The inert gas is typically 47 to 80 molar percent of the mixture 18 of gases in the container 14. The combustible gas is 4 to 15 molar percent of the mixture 18 of gases in the container 14. The oxidizer gas is 15 to 30 molar percent of the mixture 18 of gases in the mixture of gases in the container 14. The combustion rate modifier gas is 1 to 8 molar percent of the mixture 18 of gases. Preferably, the mixture 18 of gases includes 60–72 molar percent inert gas, 10–14 molar percent combustible gas, 15–20 molar percent oxidizer gas, and 3–6 molar percent combustion rate modifier gas.

In one specific embodiment, the mixture 18 of gases includes dry air which provides the inert gas (nitrogen) and the oxidizer gas (oxygen). The remainder of the mixture of gases 18 is hydrogen and carbon dioxide.

The mixture 18 of gases in the container 14 is normally under pressure. The pressure depends upon such factors as the volume of the vehicle occupant restraint 12 to be inflated, the time available for inflation, the inflation pressure desired, the volume of the chamber 16 for the mixture 18 of gases, and the molar percentage of each of the gases in the mixture 18 of gases. Normally, the mixture 18 of gases in the chamber 16 is at a pressure of 500 to 5,000 pounds per square inch (psi). Preferably, the mixture 18 of gases in the chamber 16 is at a pressure of 2,000 to 4,000 psi.

Upon the occurrence of sudden vehicle deceleration indicative of a collision for which inflation of the occupant restraint is desired, a deceleration sensor 22, of any known and suitable construction, activates an igniter 24 in the chamber 16 to ignite the combustible gas in the mixture 18 of gases. The combustion of the combustible gas is supported by the oxidizer gas.

Burning of the combustible gas results in combustion products, including heat. The pressure in the chamber 16 rises due to warming of at least the inert gas by the heat created by the burning of the combustible gas. Other gases or vapors may also result from the combustion of the combustible gas. The heated inert gas, any excess fuel and/or oxidizer gas, the inert carbonaceous gas and/or water vapor, and any such other gases or vapors comprise an inflation fluid for the vehicle occupant restraint 12. The inert carbonaceous gas and/or water vapor reduces the rate of combustion of the combustible gas. By controlling the amount of inert carbonaceous gas and/or water vapor in the container 14, inflation fluid volumes and rates of generating the inflation fluid can be controlled.

After a predetermined time, or when a predetermined pressure is reached in the chamber 16, the pressure of the inflation fluid in chamber 16 causes a wall 28 of the chamber 16 to burst. The wall 28 of the chamber 16 may also be opened on command or by the igniter 24. The inflation fluid then flows into the vehicle occupant restraint 12. As the inflation fluid flows into the vehicle occupant restraint 12, the inflation fluid inflates the vehicle occupant restraint 12 into a predetermined position for protecting a vehicle occupant.

As the inflation fluid flows from the container 14 into the vehicle occupant restraint 12, the inflation fluid expands and cools. In addition and as is known, air from the environment around the safety apparatus 10 may be aspirated into the vehicle occupant restraint 12 as the vehicle occupant restraint is inflated. This aspirated air will also cool the inflation fluid in the vehicle occupant restraint 12.

Since the combustible gas in the mixture 18 of gases burns to generate heat which increases the pressure of the gas in the chamber 16, the total volume of gas which must be stored in the container 14 to inflate the vehicle occupant restraint 12 to a desired pressure is minimized. Additionally, since combustion of the combustible gas results in gaseous material, e.g., water vapor, instead of solid particulates, there is no need for a particulate filter or the like.

Figure 2:
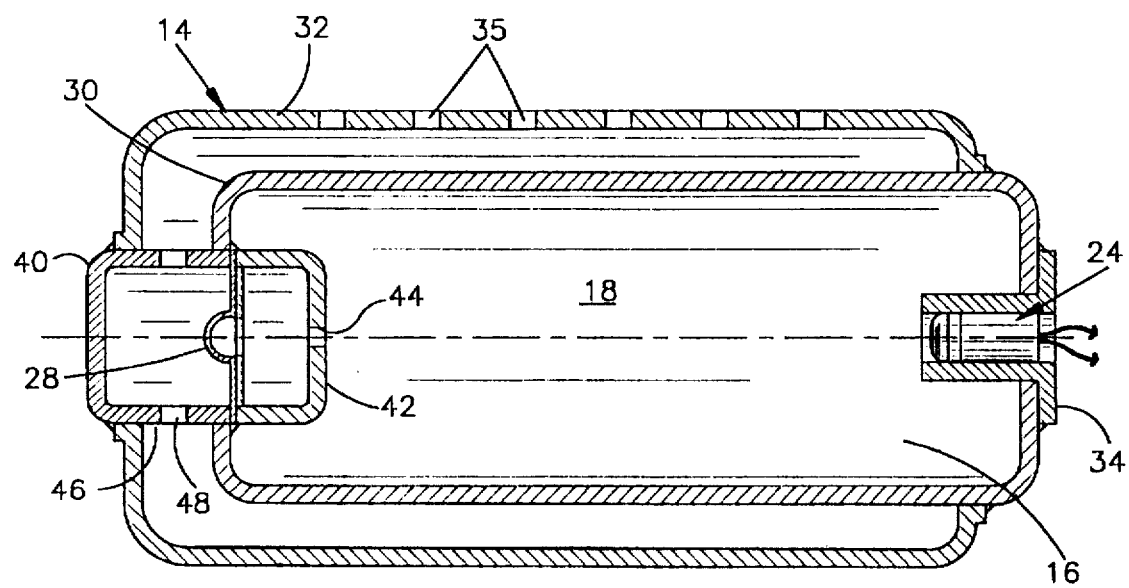
FIG. 2 is a sectional view of part of a vehicle occupant safety apparatus constructed in accordance with the present invention.

The container 14 in the safety apparatus 10 is shown in greater detail in FIG. 2. As shown in FIG. 2, the container 14 comprises a cylindrical tank 30. The tank 30 defines the chamber 16 containing the mixture 18 of gases. The tank 30 must be made of a material impervious to the gases contained in the container. Therefore, the tank 30 may be made of a suitable metal, such as steel or aluminum. A cylindrical gas diffuser 32 surrounds the tank 30. In one embodiment, the diffuser 32 has a plurality of gas flow openings 35.

An igniter housing 34 extends through an opening at one end of the tank 30, and supports the igniter 24. The igniter 24 can be any one of many known types of igniters. The igniter preferably is a pyrotechnic igniter. The specific igniter 24 shown in FIG. 2 is a known igniter containing a pyrotechnic material which is preferably zirconium potassium perchlorate. A single igniter, as shown in FIG. 2, or a plurality of igniters can be used.

A cylindrical manifold 40 extends through an opening in the end of the tank 30 opposite the igniter 24 and also extends through an adjacent opening in the diffuser 32. A circular end wall 42 of the manifold 40 located inside the tank 30 has a centrally located control orifice 44. A cylindrical side wall 46 of the manifold 40 has a circumferentially extending array of gas flow openings 48 located between the tank 30 and the diffuser 32. The end wall 28, shown schematically in FIG. 1, is a burst disk supported inside the manifold 40 between the control orifice 44 and the gas flow openings 48.

The combustible gas in the mixture 18 of gases in the chamber 16 is ignited in the presence of the oxidizer gas by the igniter 24. The combustion of the combustible gas results in gaseous products of combustion and generates heat which increases the pressure in the chamber 16. When the increasing pressure in the tank 30 reaches a predetermined level, the end wall 28 bursts. The inflation fluid comprising the heated inert gas then flows from the chamber 16 through the manifold 40. The inflation fluid flows from the manifold 40 to the gas flow openings 35 in the diffuser 32. The inflation fluid flows from the diffuser 32 through the gas flow openings 35 into the vehicle occupant restraint 12. The vehicle occupant restraint 12 is thus inflated.

In accordance with the present invention, the rate of inflation of the vehicle occupant restraint by the inflation fluid can be controlled to provide a desired volume of the vehicle occupant restraint at a given time after ignition of the combustible gas. The rate of inflation of, and the pressure in, the vehicle occupant restraint can be controlled by selecting the amount and type of combustion rate modifier gas to yield a desired burning rate of the combustible gas. The burning rate of the combustible gas determines the predetermined volumetric rate of flow of the inflation fluid into the vehicle occupant restraint.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. An apparatus for inflating a vehicle occupant restraint, such as an air bag, said apparatus comprising:

a container for holding a supply of gas;

a supply of gas in said container, said supply of gas comprising a mixture of an inert gas, a combustible gas, an oxidizer gas, and a combustion rate modifier gas selected from the group consisting of an inert carbonaceous gas, water vapor, and mixtures thereof;

said combustion rate modifier gas being present in said container in an amount sufficient to reduce the rate of combustion of said combustible gas;

igniter means for igniting said combustible gas to generate heat to heat said inert gas; and directing means for directing said inert gas from said container toward said vehicle occupant restraint.

2. The apparatus of claim 1 wherein said inert gas is nitrogen.

3. The apparatus of claim 1 wherein said combustion rate modifier gas is an inert carbonaceous gas.

4. The apparatus of claim 1 wherein said combustion rate modifier gas is water vapor.

5. The apparatus of claim 1 wherein said combustion rate modifier gas is carbon dioxide.

6. The apparatus of claim 1 wherein said combustion rate modifier gas is a mixture of carbon dioxide and water vapor.

7. The apparatus of claim 1 wherein said oxidizer gas is oxygen.

8. The apparatus of claim 1 wherein said combustion rate modifier is a halogenated hydrocarbon.

9. The apparatus of claim 8 wherein said halogenated hydrocarbon is selected from the group consisting of 1,1,1,1-tetrafluoromethane, and 1, 1, 2, 2-tetrafluoroethane, and mixtures thereof.

10. The apparatus of claim 1 wherein said combustible gas is hydrogen.

11. The apparatus of claim 1 wherein said combustible gas is methane.

12. The apparatus of claim 11 wherein said oxidizer gas is oxygen.

13. The apparatus of claim 12 wherein said combustion rate modifier gas is carbon dioxide.

14. The apparatus of claim 13 wherein said inert gas is nitrogen.

15. The apparatus of claim 1 wherein said inert gas is present at about 47 to about 80 mole percent based on the total moles of gases in said container.

16. The apparatus of claim 1 wherein said combustible gas is present at about 4 to about 15 mole percent based on the total moles of gases in said container.

17. The apparatus of claim 1 wherein said oxidizer gas is present at about 15 to about 30 mole percent based on the total moles of gases in said container.

18. The apparatus of claim 1 wherein said combustion rate modifier gas is present at about 1 to about 8 mole percent based on the total moles of gases in said container.

19. The apparatus of claim 16 wherein said combustion rate modifier gas is carbon dioxide.

20. An apparatus for inflating an vehicle occupant restraint, such as an air bag, said apparatus comprising:

a container for holding a supply of gas;

a supply of gas in said container comprising nitrogen at about 47 to about 80 mole percent based on the total moles of gases in said container; hydrogen at about 4 to about 15 mole percent based on the total moles of gases in said container; oxygen at about 15 to about 30 mole percent based on the total moles of gases in said container; and carbon dioxide at about 1 to about 8 mole percent based on the total moles of gases in said container;

igniter means for igniting said hydrogen to generate heat to heat said nitrogen; and directing means for directing said nitrogen as heated toward said vehicle occupant restraint.

21. The apparatus of claim 20 wherein said nitrogen is present at about 60 to about 72 mole percent; said hydrogen is present at about 10 to about 14 mole percent, said oxygen is present at about 15 to about 20 mole percent; and said carbon dioxide is present at about 3 to about 6 mole percent.

* * * * *